Feb. 11, 1930.   S. KARRER   1,746,777
APPARATUS FOR TESTING BRAKES
Filed July 2, 1926   2 Sheets-Sheet 1

Sebastian Karrer.
INVENTOR
BY Horace S. Beall
ATTORNEY

Feb. 11, 1930.      S. KARRER      1,746,777
APPARATUS FOR TESTING BRAKES
Filed July 2, 1926      2 Sheets-Sheet 2
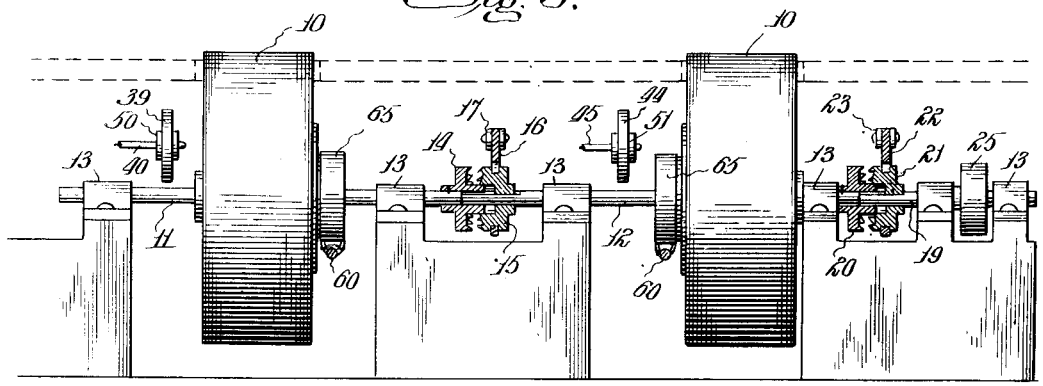
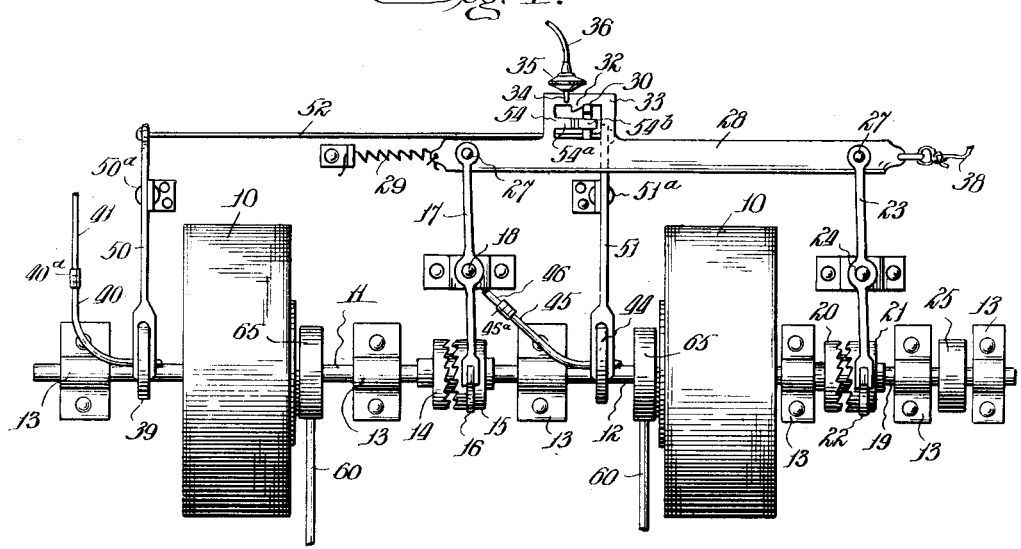
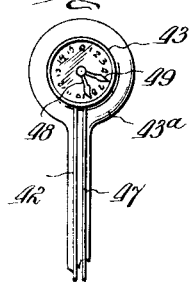
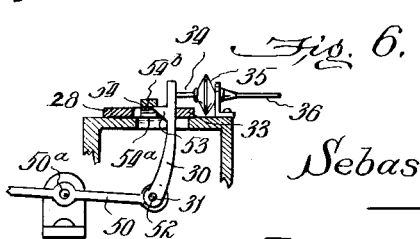
Sebastian Karrer,
INVENTOR.
BY
ATTORNEY Patented Feb. 11, 1930

1,746,777

UNITED STATES PATENT OFFICE

SEBASTIAN KARRER, OF WASHINGTON, DISTRICT OF COLUMBIA, ASSIGNOR TO BRAKE SYNCHROMETER CO., OF BOSTON, MASSACHUSETTS, A CORPORATION OF MASSACHUSETTS

APPARATUS FOR TESTING BRAKES

Application filed July 2, 1926. Serial No. 120,127.

My invention is an apparatus for conveniently and accurately testing the brakes of vehicles—particularly band-brakes used in connection with the operation of an automobile—and contemplates an arrangement of mechanism by which the test is performed while the vehicle is at rest to determine the effect of the brake device on the continued motion of the vehicle-wheel to which the brake is applied, under conditions corresponding with the travel of a vehicle or automobile over a road surface, with provision for indicating the decreasing momentum and registering the number of revolutions of the vehicle wheel in coming to rest after the application of the brakes.

My invention further contemplates an arrangement by which the operation of the mechanisms for performing the test is controlled by the operator who applies the brakes, the indicator which cooperates to register the effectiveness of the wheel brake being located within sight of the operator so that he may readily note the action of the brake device, and in the present instance provision is made for testing a pair of wheel-brakes simultaneously, as those applied to the two rear wheels of an automobile.

With these principal objects in view my invention consists primarily in providing a heavy brake-testing-wheel, or pair of heavy brake-testing-wheels, on which the vehicle-wheel or wheels having the brakes rest, for revolving the testing-wheel and brake-wheel in unison; together with means for registering the effect of the brakes on the momentum of the brake-wheels respectively as affected by the decreasing momentum of the heavy testing-wheels.

My invention further consists in the particular construction and arrangement of the several cooperating mechanisms constituting the brake testing apparatus, all as hereinafter fully described and set forth in the appended claims.

In the accompanying drawings:

Fig. 3 is an enlarged detail view of the testing wheels and means for revolving the same.

Fig. 4 is a plan view of the testing wheels and mechanism cooperating therewith.

Fig. 5 is a detail front view of the registering device, and

Fig. 6 is a detail view of the tripping mechanism, showing the same in released position.

Figure 1:
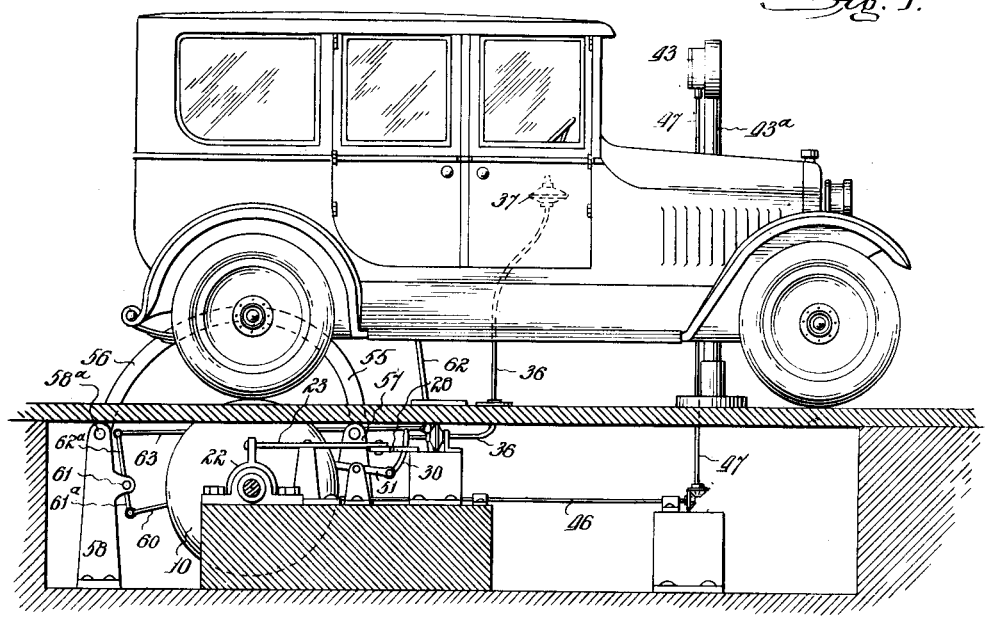
Figure 1 is a side elevation illustrating the apparatus, the principal parts thereof being located in a covered pit shown in section.

In carrying out my invention I provide in the first place two flat-rim heavy wheels 10 10, for testing the brake devices on a pair of automobile wheels simultaneously, and for convenience in performing the test these testing-wheels are located in a covered pit, as shown in the drawings, projecting through and slightly above the top so that the automobile can be driven over the latter to bring the wheels having the brakes to be tested in position to rest on said testing-wheels, the latter being spaced apart to correspond with the standard width of tread of automobile wheels and having broad peripheries to receive them. These testing-wheels are affixed to independent shafts 11 and 12 mounted in bearing boxes 13 supported in the pit, said shafts being connected by an ordinary clutch comprising a fixed member 14 and cooperating sliding member 15 on the adjoining ends of the two shafts, the slidable member having a yoke 16 to which is connected an operating lever 17, pivoted at 18, and having a shiftable movement for operating said slidable member. For the purpose of turning the shafts when connected by the clutch one of them, as 12, is connected by a clutch to an auxiliary power driven shaft 19, this last mentioned clutch being also of the usual form with a member 20 fixed on the end of shaft 12 and cooperating member 21 slidable on shaft 19, the slidable member having a yoke 22 operated by lever 23 pivoted at 24. It will be noted that by affixing the testing-wheels to independent shafts connected to each other by clutch and to the power driven shaft by clutch said testing-wheels may be revolved in unison by the power driven shaft when the clutches are engaged, and that motion of the same will continue independently of each other and of the power driven shaft when the clutches are disengaged; and, furthermore, that the testing-wheels may be revolved in unison or independently by power of the automobile engines transmitted to the wheels resting on said testing-wheels, although I prefer that the revolving motion be imparted by the power driven shaft 19, which latter is driven by a motor (not shown) connected to the pulley 25 by belt 26. The testing-wheels are fixed to their shafts in any well known manner.

To provide for operating the two clutches simultaneously the levers 17 and 23 are pivotally connected at 27 to a slidable plate 28 actuated in one direction—to disengage the clutches—by spring 29, and in order to hold the clutches engaged there is a trip-lever 30, pivoted at 31, (Fig. 6), which engages a catch (Fig. 4) formed on said plate, for which purpose the latter is provided with a rectangular side extension 33 through which the trip-lever passes upwardly. The trip-lever is disengaged from catch 31 by push-pin 34 carried and operated by a bellows 35 into which air under pressure is forced through a tube 36 of sufficient length to extend out of the pit and into the automobile where it is provided with a bellows 37 for operation by the person applying the brakes, so that the brakes can be applied and clutches released simultaneously. It will be understood of course that this is a common means for releasing mechanisms for various purposes and consequently I may use any other well known means for tripping the lever 30 to release the clutches, and in order to shift the plate 28 to re-engage the clutches and tripping-lever a pull device, as cable or chain 38, is attached to the end of the plate opposite to that to which the spring is attached and extends through the top of the pit for convenient operation.

Figure 2:
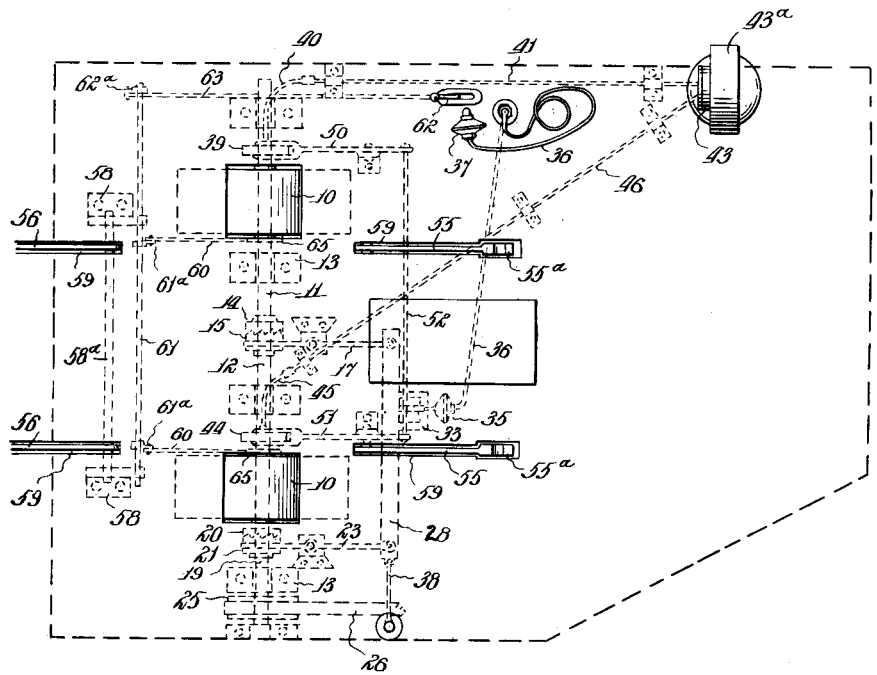
Fig. 2 is a plan view, the mechanism located in the pit being shown in dotted lines.

As will be readily understood by reference to the drawings when the clutches are engaged (Fig. 2) trip-lever 30 is in engagement with catch 32 of the spring-actuated clutch operating plate 28 so that the testing-wheels are revolved by the motor-driven shaft 19, and as the automobile wheels having the brakes to be tested rest upon said testing-wheels the required momentum will be imparted thereto. When the clutches are released to disconnect the motor-driven shaft and permit independent motion of shafts 11 and 12 carrying the testing-wheels the inertia or continued motion of the testing-wheels will be imparted to the brake-wheels of the automobile in like manner to the travel of the automobile over a road surface when the clutch of the automobile is thrown out of gear, the weight of the testing-wheels being suitably proportioned to this end. In making the test, therefore, the brakes should be applied simultaneously with the operation of releasing the clutches, and of course the effect of each brake device or band-brake will be indicated by the decreasing momentum of the co-acting testing-wheel and brake-wheel. Now for indicating the decreasing momentum and registering the number of revolutions of the testing wheels in coming to rest, with respect to each brake device or band-brake, I provide friction-wheels for the shafts 11 and 12 and connect them to an indicator or gauge—friction-wheel 39, engaging shaft 11, being connected by flexible shaft 40 and coupling 40$^a$ to horizontal shaft 41 geared to vertical shaft 42 (Fig. 5) leading to the indicator or gauge 43 supported by upright 43$^a$; while friction-wheel 44, engaging shaft 12, is likewise connected to the indicator or gauge by flexible shaft 45, coupling 45$^a$, horizontal shaft 46 and vertical shaft 47, the vertical shafts 42 and 47 operating separate indicating-fingers 48 and 49 respectively. The indicator or gauge 43 is of an ordinary or well known type having the usual gears operated by the shafts 42 and 47 for moving the fingers over the dial and means for returning the fingers to zero whereby the movement of each finger will indicate the decreasing momentum of the testing-wheel and brake-wheel with which it cooperates and register the revolutions thereof in coming to rest when the clutches are disengaged and the brakes applied. For moving the friction-wheels into and out of engagement with their respective shafts they are carried by levers 50 51, pivoted at 50$^a$ 51$^a$, and connected at their outer ends by a cross-bar 52 by which they are operated in unison, this operation being accomplished in the present instance by the tripping-lever 30, hereinbefore referred to, whereby the clutch mechanism and registering mechanism are both operated simultaneously by the push-pin 34. To accomplish this tripping-lever 30 is pivoted at its lower end on the cross-bar 52 and is provided with a catch 53 riding on the underside of a cross-piece or cam-member 54 formed on the clutch operating plate 28 in the rectangular side extension 33 thereof, said cross-piece or cam-member having a straight portion 54$^a$ on a line with the push-pin 34 and shoulder of catch 32 by which the tripping-lever is held depressed and an upwardly-projecting portion or guide finger 54$^a$ which permits said tripping-lever to move upwardly for engagement of the friction-wheel with the shaft when the tripping-lever is released from catch 32 and plate 28 is operated by the spring to release the clutches. When the clutch operating plate is returned by pulling on cable 38 the tripping-lever is depressed by riding on the underside of cam-member or guide-finger 54$^a$ and will gravitate into engagement with the catch 32.

To hold the brake-wheels of the automobile in position upon the testing-wheels curved levers 55 and 56 are pivoted to the upper ends of standards 57 and 58 located in the pit and are normally housed in openings or recesses 59 in the top of the pit so as to be out of the way while the automobile is being driven into position for the test, said holding levers each having a head at its outer end, as 55ª, recessed to fit over the axle of the automobile, and to stop the rotating motion of the testing-wheels at any time they are each provided with an ordinary band-brake 65 connected by rod 60 to arms 61ª projecting downwardly from a cross-bar 61 supported in the standards 58, the cross-bar being rocked by lever 62 which is connected thereto, or to arms 62ª projecting upwardly therefrom, by link 63. Operating lever 62 is pivoted to a suitable support within the pit and projects through an opening in the top for convenience of operation. These band-brakes on the testing-wheels are merely for the purpose of stopping the rotation of said testing-wheels at any time it may be desired, but it will be understood of course that they are released during the test of the automobile brakes.

In making a test with the apparatus herein described the automobile is run over the top of the pit so as to rest the wheels having the brakes to be tested upon the testing-wheels 10 10 and they are held thereon by engaging the curved levers 55 and 56 with the axle of said brake-wheels, after which the motor-driven shaft 19, as well as shafts 11 and 12, are connected by the clutches to revolve the testing-wheels and brake-wheels at the required speed; then as the brakes of the automobile are applied in the usual manner by depressing the foot-lever (not shown) the bellows 37 is operated to simultaneously release the clutches and move the friction-wheels into engagement with the shafts of the testing-wheels, whereby the decreasing momentum of the brake-wheels in coming to rest—acting against the momentum of the heavy testing-wheels—will be indicated on the dial of the indicating device or gauge 43 so that the effect of the band-brakes on the brake-wheels may be noted, that is to say the fingers on the dial will show the decreasing momentum of each brake-wheel after the application of the brakes and will also record the extent of movement or revolutions of said brake-wheels to accurately register the result of the test by the apparatus. The speed of the testing-wheels and brake-wheels at the time of starting the test can be ascertained by the speedometer of the automobile connected to one of the brake-wheels, but in the event neither one of the brake-wheels is connected to a speedometer such connection of a speedometer may be made to a brake-wheel or testing-wheel if desired. It will be obvious that a test of the brakes of an automobile can be quickly performed by means of the apparatus, and as the condition of each brake device is accurately indicated by movement of the indicating fingers over the dial it will facilitate their proper adjustment.

As hereinbefore explained the bellows 37 for operating the releasing means of the apparatus is extended into the automobile so that it can be operated by the person making the test simultaneously with the operation of applying the brakes, and this may be accomplished by hand or the operating means, as bellows 37, may be placed under the foot-pedal whereby operation of the latter will also operate the bellows. Other obvious changes may be resorted to within the scope of my claims.

I claim:

1. An apparatus for testing wheel-brakes comprising a pair of heavy testing-wheels upon which the wheels carrying the brakes to be tested are adapted to be mounted for rotation by said testing-wheels as motion is initially imparted to the latter, separate shafts for said testing-wheels, a clutch connecting said shafts whereby the testing wheels will be caused to turn in unison, a registering device, means whereby said device is controlled to move proportionately to the shafts and testing-wheels to indicate the decreasing momentum and register the number of revolutions of said testing-wheels, respectively, as they come to rest after the application of the brakes, said means being movable into and out of operation with the shafts of the testing-wheels, and means for simultaneously releasing the clutch and moving the controlling means of the registering device into the operative position.

2. An apparatus for testing wheel-brakes comprising a heavy testing-wheel upon which the wheel carrying the brake to be tested is adapted to be mounted and to which motion is imparted for revolving said wheels in unison, a registering device, and means whereby said device is controlled to move proportionately to the shaft of the testing-wheel to indicate the decreasing momentum and register the number of revolutions of the latter in coming to rest after the application of the brakes, said means comprising a lever carrying a friction-wheel movable into and out of operation with the shaft of the testing-wheel, a catch engaging the lever for holding the friction-wheel out of operation, a bellows and push-pip for releasing the lever, a tube connected to the bellows, and means at the outer end of the tube for forcing air into the bellows.

3. An apparatus for testing wheel-brakes comprising a pair of heavy testing-wheels upon which the wheels carrying the brakes to be tested are adapted to be mounted for rotation thereby, separate shafts for said testing-wheels, a clutch connecting said shafts by which the testing-wheels will be caused to turn in unison, and means for releasing the clutch; together with a registering device, and means whereby said device is controlled to move proportionately to the shafts and testing-wheels to indicate the decreasing momentum and register the number of revolutions of the testing-wheels in coming to rest after the application of the brakes, said means comprising levers connected together for movement in unison and having friction-wheels movable in and out of operation with the shafts of the testing-wheels, a tripping-lever engaging said connected levers to hold the friction-wheels normally out of operative position, and means for releasing the clutch and levers simultaneously.

4. An apparatus for testing wheel-brakes comprising a pair of heavy testing-wheels upon which the wheels carrying the brakes to be tested are adapted to be mounted for rotation thereby, separate shafts for said testing-wheels, a clutch connecting said shafts by which the testing-wheels will be caused to turn in unison, an auxiliary power driven shaft and clutch connecting the same to one of the aforesaid shafts, and means for operating the clutches simultaneously.

5. An apparatus for testing wheel-brakes comprising a pair of heavy testing-wheels upon which the wheels carrying the brakes to be tested are adapted to be mounted for rotation thereby, separate shafts for said testing-wheels, a clutch connecting said shafts by which the testing-wheels will be caused to turn in unison, an auxiliary power driven shaft and clutch connecting the same to one of the aforesaid shafts, a sliding plate connected to and operating the clutches simultaneously, a spring actuating the plate to disengage the clutches, a tripping-lever, a catch on the plate engaging the tripping-lever to hold said plate against the action of the spring with the clutches in engagement, and means for tripping said lever.

6. An apparatus for testing wheel-brakes comprising a pair of heavy testing-wheels upon which the wheels carrying the brakes to be tested are adapted to be mounted for rotation thereby, separate shafts for said testing-wheels, a clutch connecting said shafts by which the testing-wheels will be caused to turn in unison, an auxiliary power driven shaft and clutch connecting the same to one of the aforesaid shafts, a sliding plate connected to and operating the clutches simultaneously, said plate having a catch-member, and a spring adapted to actuate the plate to disengage the clutches; together with a registering device, and means whereby said device is controlled to move proportionately to the shafts and testing-wheels to indicate the decreasing momentum and register the number of revolutions of the testing-wheels in coming to rest after the application of the brakes, said means comprising levers connected together for movement in unison and having friction-wheels movable in and out of operative position, a tripping-lever carried by said connected levers to engage the aforesaid catch-member on the sliding plate for holding the latter against the action of the spring with the friction-wheels normally out of operative position and the clutches in engagement, and means for tripping said lever.

SEBASTIAN KARRER.